(12) United States Patent
Morishita et al.

(10) Patent No.: US 12,235,244 B2
(45) Date of Patent: Feb. 25, 2025

(54) LOADING PAD AND LOADING DEVICE

(71) Applicant: MITSUBISHI HEAVY INDUSTRIES, LTD., Tokyo (JP)

(72) Inventors: Kunihiro Morishita, Tokyo (JP); Takashi Yari, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 246 days.

(21) Appl. No.: 18/096,911

(22) Filed: Jan. 13, 2023

(65) Prior Publication Data

US 2023/0228658 A1    Jul. 20, 2023

(30) Foreign Application Priority Data

Jan. 17, 2022  (JP) .................................. 2022-005339

(51) Int. Cl.
*G01N 3/02*   (2006.01)
*G01N 3/04*   (2006.01)
*G01N 3/08*   (2006.01)

(52) U.S. Cl.
CPC ..................................... *G01N 3/02* (2013.01)

(58) Field of Classification Search
CPC .. G01N 3/02; G01N 3/08; G01N 3/04; G01N 1/04; G01N 3/12; G01N 19/04; G01N 33/383; A47C 27/14; A47C 7/021; G01M 5/005; A61F 13/15; A61F 13/472; A61F 13/0213; A61F 13/15203; B60N 2/646
See application file for complete search history.

(56) References Cited

FOREIGN PATENT DOCUMENTS

JP            06288859 A  * 10/1994 ............... G01M 5/00
WO    WO-2011057827 A2  *  5/2011 ............ G01M 7/022

* cited by examiner

*Primary Examiner* — Brandi N Hopkins
(74) *Attorney, Agent, or Firm* — Birch, Stewart, Kolasch & Birch, LLP

(57) ABSTRACT

A loading pad to be attached to a specimen to apply a load to the specimen includes: a back skin on which the load is applied; an elastic body that is provided between the back skin and the specimen; and an inserted member that is provided between the elastic body and the specimen. The back skin, the elastic body, and the inserted member are bonded as one unit. The inserted member is less rigid than the specimen, and is more rigid than the elastic body.

9 Claims, 7 Drawing Sheets

LOADING PAD AND LOADING DEVICE

CROSS-REFERENCE TO RELATED APPLICATIONS

The present application claims priority to and incorporates by reference the entire contents of Japanese Patent Application No. 2022-005339 filed in Japan on Jan. 17, 2022.

FIELD

The present disclosure relates to a loading pad and a loading device for applying load to a specimen.

BACKGROUND

Having been conventionally known as a loading pad is a tension pad for testing the strength of a structure, the tension pad including a back skin for applying a load to a specimen, and a low-elastic body provided and bonded between the specimen and the back skin (for example, see Patent Literature 1).

CITATION LIST

Patent Literature

Patent Literature 1: Japanese Patent Application Laid-open No. H6-288859

SUMMARY

Technical Problem

The tension pad has a structure that includes the specimen and the back skin that are stiff members, and in which a low-elastic body is bonded between these hard members using an adhesive agent. In such a structure, because the rigidity varies greatly across these members, stress concentrates locally on the layers of adhesive agent in the boundary between the specimen and the low-elastic body, and the layer of an adhesive agent in the boundary between the low-elastic body and the back skin, and such stress causes a deterioration of the load-bearing capacity of the loading pad.

Therefore, an object of the present disclosure is to provide a loading pad and a loading device capable of alleviating local concentration of stress, and of suppressing a deterioration of the load-bearing capacity.

Solution to Problem

A loading pad according to the present disclosure is to be attached to a specimen to apply a load to the specimen. The loading pad includes: a back skin on which the load is applied; an elastic body that is provided between the back skin and the specimen; and an inserted member that is provided between the elastic body and the specimen. The back skin, the elastic body, and the inserted member are bonded as one unit. The inserted member is less rigid than the specimen, and is more rigid than the elastic body.

A loading device according to the present disclosure includes: the above-described loading pad; a connector jig that connects a plurality of the loading pads; and an actuator that applies a load on the specimen via the loading pad and the connector jig.

Advantageous Effects of Invention

According to the present disclosure, it is possible to alleviate local concentration of stress, and to suppress a deterioration in the load-bearing capacity.

DESCRIPTION OF EMBODIMENTS

Some embodiments according to the present invention will now be explained in detail with reference to some drawings. These embodiments are not intended to limit the scope of the present invention in any way. In addition, the elements described in the following embodiments include those that are substitutable or that can be easily substituted by those skilled in the art, or those that are substantially the same. Furthermore, the elements described below can be combined as appropriate, and when there are more than one embodiment, such embodiments may be combined.

First Embodiment

Loading Device

A loading device 10 provided with a loading pad 31 according to the first embodiment is a device that applies a tensile load to a specimen 5. Examples of the specimen 5 includes a wing body of an aircraft, such as a wing or a stabilizer.

Figure 1:
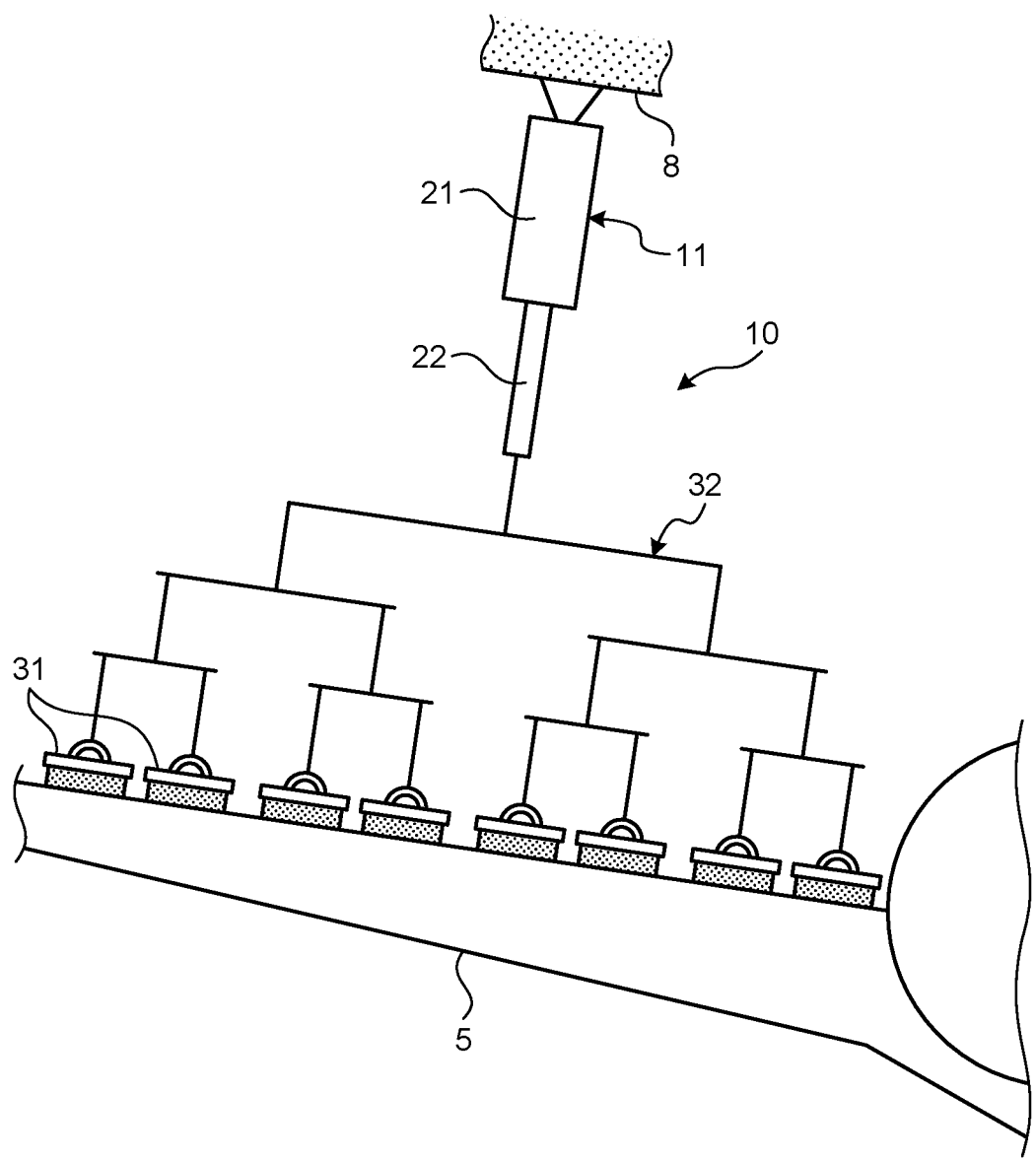
FIG. 1 is an explanatory schematic illustrating a loading device according to a first embodiment.
Figure 2:
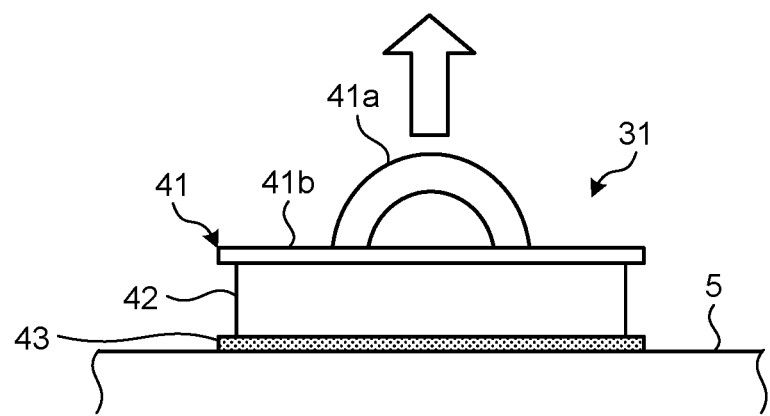
FIG. 2 is a side view of a loading pad according to the first embodiment.
Figure 3:
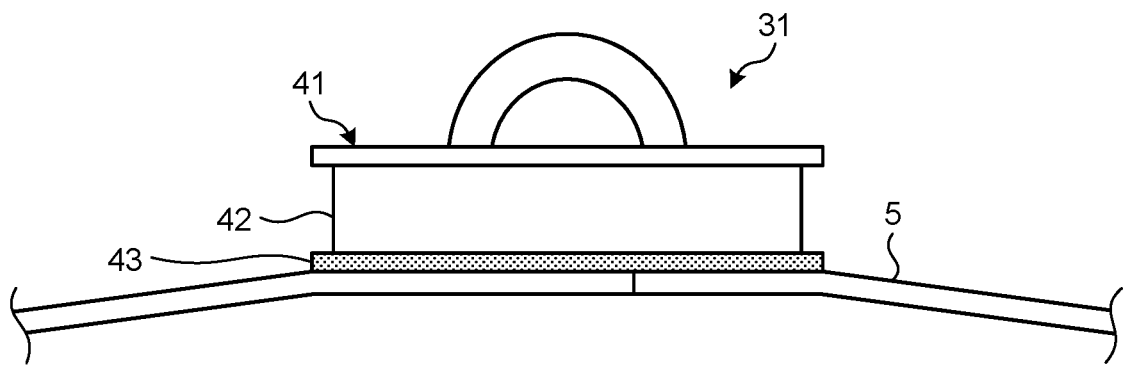
FIG. 3 is a side view of another example of the loading pad according to the first embodiment.
Figure 4:
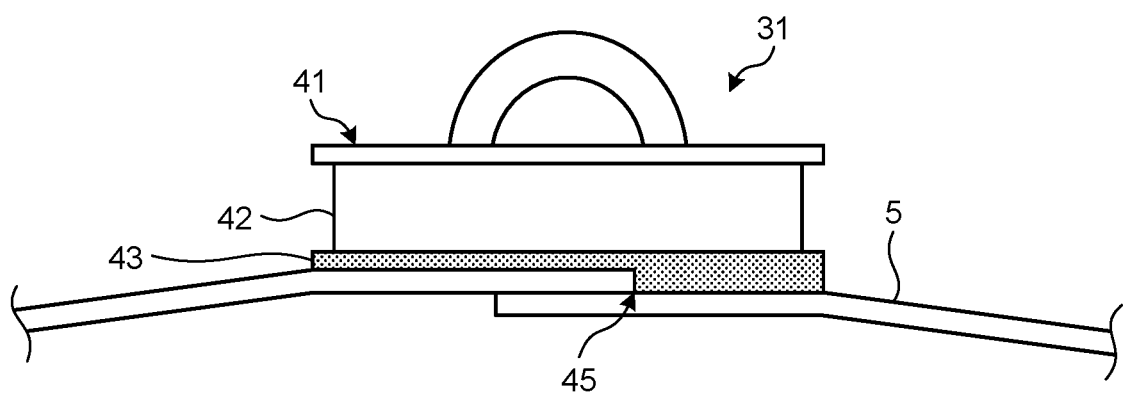
FIG. 4 is a side view of another example of the loading pad according to the first embodiment.
Figure 5:
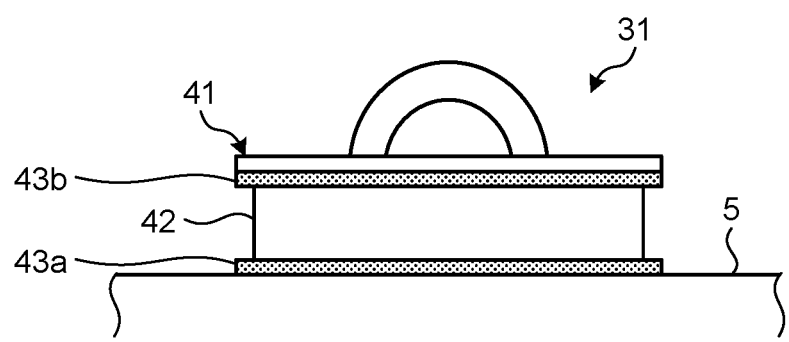
FIG. 5 is a side view of another example of the loading pad according to the first embodiment.

FIG. 1 is an explanatory schematic illustrating a loading device according to the first embodiment. FIG. 2 is a side view of the loading pad according to the first embodiment. FIGS. 3 to 5 are side views of another example of the loading pad according to the first embodiment.

As illustrated in FIG. 1, the loading device 10 that applies a tensile load, as an example, includes an actuator 11 that is mounted on a support 8, a connector jig 32 that is connected to the actuator 11, and a plurality of the loading pads 31 that are attached to the connector jig 32.

The actuator 11 applies a tensile load on the specimen 5 via the connector jig 32 and the loading pad 31. The actuator 11 is a hydraulic actuator, for example, and is provided in a manner suspended from the support 8. The actuator 11 includes a cylinder 21, and a piston 22 that moves linearly with respect to the cylinder 21. The cylinder 21 is mounted on the support 8. The piston 22 advances and retracts with respect to the cylinder 21, and the connector jig 32 is attached to the tip of the piston 22.

The connector jig 32 has a structure connecting one actuator 11 to the plurality of loading pads 31. The connector jig 32 is a jig made from steel members structured in a shape of tournament brackets, for example. In other words, the connector jig 32 has a shape branching into a plurality, in a direction from the one actuator 11 to the loading pads 31.

The loading pads 31 are jigs that are mounted on the specimen 5 by being bonded to the specimen 5 with an adhesive agent, and are detachable from the specimen 5. As illustrated in FIG. 2, a tensile load is applied to the loading pads 31 as a load.

The loading pad 31 includes a back skin 41, an elastic body 42, an inserted member 43 that are placed on top of one another in the thickness direction, and bonded as one unit using an adhesive agent.

The back skin 41 includes a connector portion 41a where the connector jig 32 is connected, and a plate portion 41b that is bonded to the elastic body 42. The connector portion 41a is configured as a handle having an arc shape, for example, and receives an application of a tensile load via the connector jig 32. The plate portion 41b has a rectangular shape in a plan view, for example, and is made of a metallic material. The plate portion 41b has a surface serving as a bonding surface on the side facing the elastic body 42, and this surface is bonded to the elastic body 42 using an adhesive agent. The plate portion 41b may have any shape including a rectangular or circular shape.

The elastic body 42 is provided between the back skin 41 and the inserted member 43. As the elastic body 42, rubber is used as an example, and the elastic body 42 is capable of deforming in a manner following a relative displacement of the back skin 41 with respect to the specimen 5. The elastic body 42 has a surface serving as a bonding surface on the side facing the inserted member 43, and is bonded to the inserted member 43 using an adhesive agent.

The inserted member 43 is provided between the elastic body 42 and the specimen 5. As the inserted member 43, resin is used, for example. The inserted member 43 has a shape complementary to the space formed by the specimen 5 and the elastic body 42. In FIG. 2, because the facing surfaces of the specimen 5 and the elastic body 42 extend parallel with each other, the inserted member 43 has a shape of a flat plate. The inserted member 43 has a surface serving as a bonding surface on the side facing the specimen 5, and is bonded to the specimen 5 using an adhesive agent.

The inserted member 43 is less rigid than the specimen 5, and more rigid than the elastic body 42. In other words, the loading pad 31 becomes less rigid from the side facing the specimen 5 toward the elastic body 42.

Specifically, the Young's modulus of the inserted member 43 is set lower than that of the specimen 5, and higher than that of the elastic body 42. The Young's modulus of the specimen 5 using a metallic material containing aluminum is 70 GPa or so, for example, and the specimen 5 using a metallic material containing iron is 200 GPa or so. Furthermore, the Young's modulus of the elastic body 42 using an elastic material containing chloroprene rubber is 5 MPa or so, for example. With this configuration, the Young's modulus of the inserted member 43 is set to a range of 1 GPa to 10 GPa.

Another example of the inserted member 43 will now be explained with reference to FIGS. 3 and 4. FIG. 3 illustrates an example of the inserted member 43 having a curved bonding surface to be bonded to the specimen 5, and FIG. 4 illustrates an example of the inserted member 43 having a step-shaped bonding surface to be bonded to the specimen 5. As mentioned earlier, the inserted member 43 has a shape complementary to the space formed by the specimen 5 and the elastic body 42. Therefore, in FIG. 3, the inserted member 43 has a curved surface on the side facing the specimen 5. Furthermore, in FIG. 4, the inserted member 43 has a step-shaped portion 45 on the surface facing the specimen 5. The inserted member 43 may be formed using a three-dimensional modeling device. In such a case, the inserted member 43 can be easily formed even when the shape of the inserted member 43 is complicated.

Another example of the loading pad 31 will now be explained with reference to FIG. 5. The loading pad 31 illustrated in FIG. 5 has another inserted member 43 provided between the back skin 41 and the elastic body 42. In other words, the loading pad 31 includes a first inserted member 43a provided between the specimen 5 and the elastic body 42, and a second inserted member 43c that is provided between the back skin 41 and the elastic body 42. The first inserted member 43a is the same as the inserted member 43 described above. The second inserted member 43b is less rigid than the back skin 41, and more rigid than the elastic body 42. In other words, the loading pad 31 becomes less rigid from the back skin 41 toward the elastic body 42. The material, the Young's modulus, and the like of the second inserted member 43b may be the same as those of the first inserted member 43a.

The loading device 10 including the loading pads 31 described above causes the actuator 11 to apply a tensile load to the loading pads 31 via the connector jig 32. The loading pads 31 then receive the load in the direction separating from the specimen 5. By bonding the elastic body 42 to the specimen 5 with the inserted member 43 therebetween, the change in the rigidity across the loading pad 31 from the side of the specimen 5 toward the elastic body 42 can be made more gradual, than when the elastic body 42 is bonded directly to the specimen 5. With such a loading pad 31, it is possible to alleviate the local concentration of the stress in the adhesive layer in the boundary between the specimen 5 and the elastic body 42, and therefore, to ensure the load-bearing capacity for a tensile load. In the above example, a tensile load is explained to be a main force exerted, but it should be needless to say that the same advantageous effects can be achieved even when a load in a shear direction or compressing direction is exerted.

Second Embodiment

Figure 6:
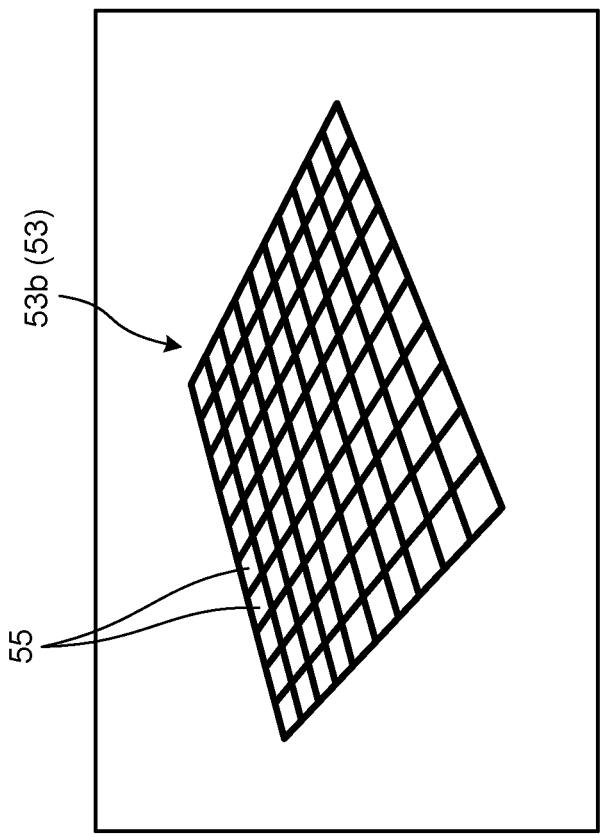
FIG. 6 is a perspective view of a loading pad according to a second embodiment.
Figure 6:
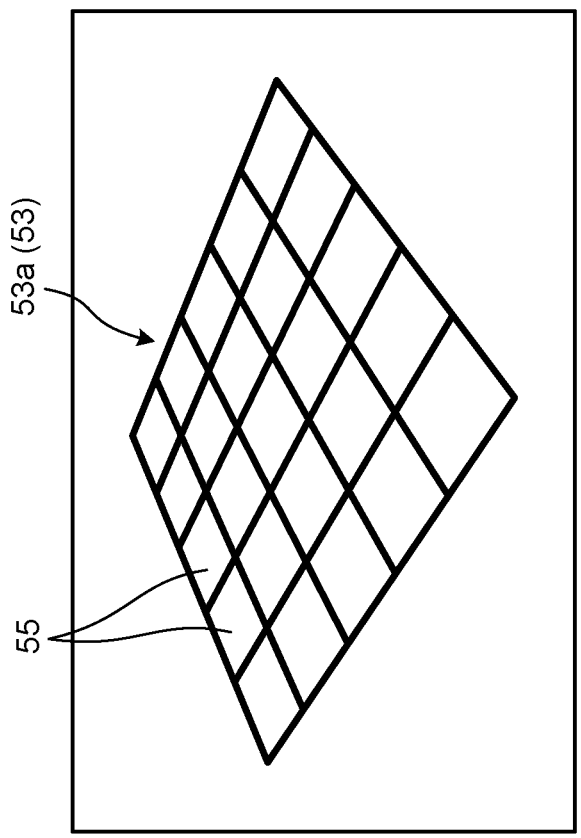
Figure 7:
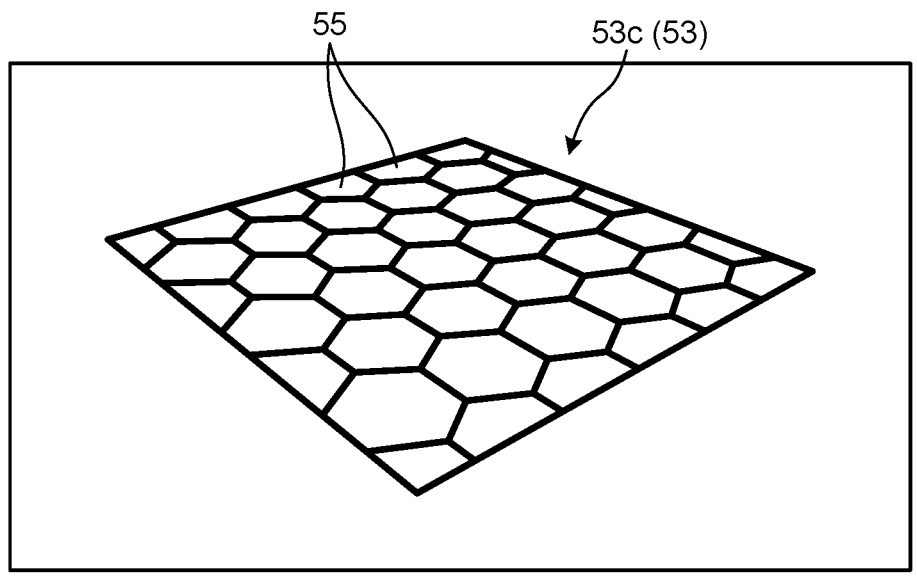
FIG. 7 is a perspective view of another example of the loading pad according to the second embodiment.
Figure 8:
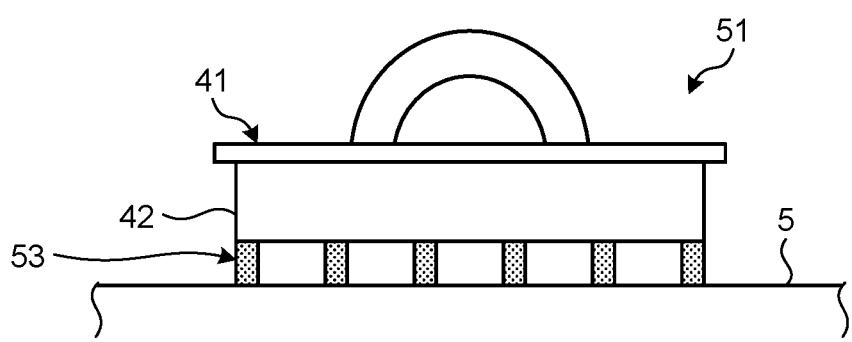
FIG. 8 is a side view of the loading pad according to the second embodiment.
Figure 9:
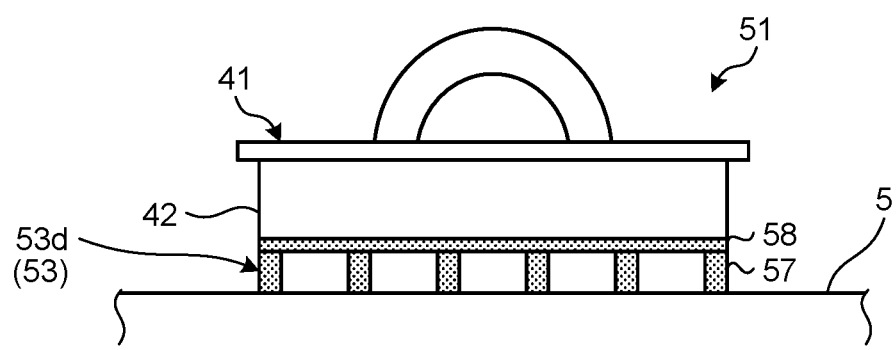
FIG. 9 is a side view of another example of the loading pad according to the second embodiment.
Figure 10:
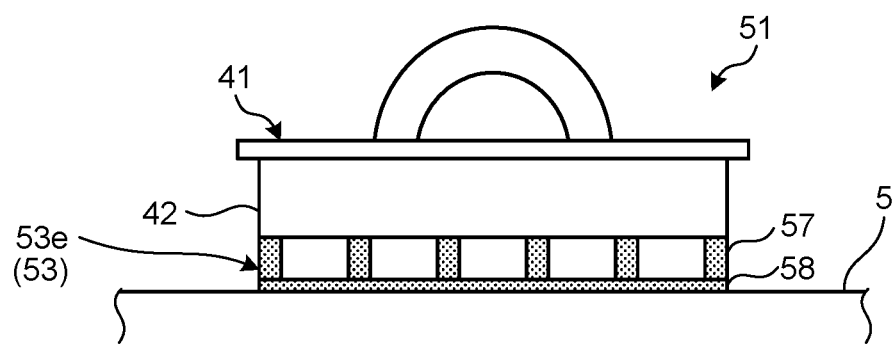
FIG. 10 is a side view of another example of the loading pad according to the second embodiment.

A second embodiment will now be explained with reference to FIGS. 6 to 10. In the second embodiment, to avoid redundancy in the explanation, the parts that are different from those in the first embodiment will be explained, and the parts having the same structures as those in the first embodiment will be explained by assigning the same reference numerals thereto. FIG. 6 is a perspective view of the loading pad according to the second embodiment. FIG. 7 is a perspective view of another example of the loading pad according to the second embodiment. FIG. 8 is a side view of the loading pad according to the second embodiment. FIGS. 9 and 10 are side views of another example of the loading pad according to the second embodiment.

In the loading pad 51 according to the second embodiment, cavities 55 are provided to the inserted member 43 according to the first embodiment. Specifically, the inserted member 53 according to the second embodiment has a plurality of cavities 55 provided in a manner passing therethrough in the thickness direction. In other words, the inserted member 53 is a porous member. The cavities 55 have one of the shapes illustrated in FIGS. 6 and 7. An inserted member 53a illustrated on the left side in FIG. 6 has a rectangular shape in a plan view, and the cavities 55 also have a rectangular shape in a plan view. In other words, the inserted member 53a has a rectangular grid-like shape. An inserted member 53b illustrated on the right side in FIG. 6 also has a rectangular shape in a plan view, in the same manner as in the example illustrated on the left side in FIG. 6, and the cavities 55 also have a rectangular shape in a plan view. The cavities 55 on the left side in FIG. 6 are smaller in size than the cavities 55 on the right side in FIG. 6.

An inserted member 53c illustrated in FIG. 7 has a rectangular shape in a plan view, but the cavities 55 have a polygonal shape (e.g., hexagonal shape) in a plan view. In other words, the inserted member 53c has a honeycomb structure.

Defining a cavity ratio as the ratio of the areas of the cavities 55 per a unit area in a view in the thickness direction, the inserted member 53 illustrated in FIGS. 6 and 7 has a cavity ratio within a range of 70% to 90%. The inserted member 53a illustrated on the left side in FIG. 6 and the inserted member 53b illustrated on the right side in FIG. 6 have cavities 55 of different sizes, and the cavities 55 in the inserted member 53a illustrated on the left side in FIG. 6 have a larger size than the cavities 55 in the inserted member 53b illustrated on the right side in FIG. 6. Therefore, the cavity ratio of the inserted member 53a is higher than that of the inserted member 53b.

As illustrated in FIG. 8, the cavities 55 in the inserted member 53 are provided between the specimen 5 and the elastic body 42 on a cross section in the thickness direction. In the process of bonding the specimen 5, the inserted member 53, and the elastic body 42, the cavities 55 are filled with an adhesive agent. In other words, the specimen 5 and the elastic body 42 are bonded with the adhesive agent in the cavities 55 therebetween.

As illustrated in FIGS. 9 and 10, the inserted member 53 according to the second embodiment may further include a flat plate 58 bonded to one surface in the thickness direction. An inserted member 53d illustrated in FIG. 9 includes a member body 57 provided with the cavities 55, and a flat plate 58 that is bonded to the member body 57 on the side facing the elastic body 42. The member body 57 is the same as the inserted member 53 according to the second embodiment. The flat plate 58 is made of the same material as the member body 57, and is bonded to the member body 57 as one unit. The inserted member 53e illustrated in FIG. 10 includes the member body 57 provided with the cavities 55 and the flat plate 58 bonded to the member body 57 on the side facing the specimen 5. The member body 57 is the same as the member body 57 illustrated in FIG. 9, and the flat plate 58 is also the same as the flat plate 58 illustrated in FIG. 9. The inserted member 53 is more rigid on the side provided with the flat plate 58. Therefore, the inserted member 53 illustrated in FIG. 10 is more rigid on the side facing the specimen 5, and less rigid on the side facing the elastic body 42. In other words, the loading pad 51 becomes less rigid from the side of the specimen 5 toward the elastic body 42.

Third Embodiment

Figure 11:
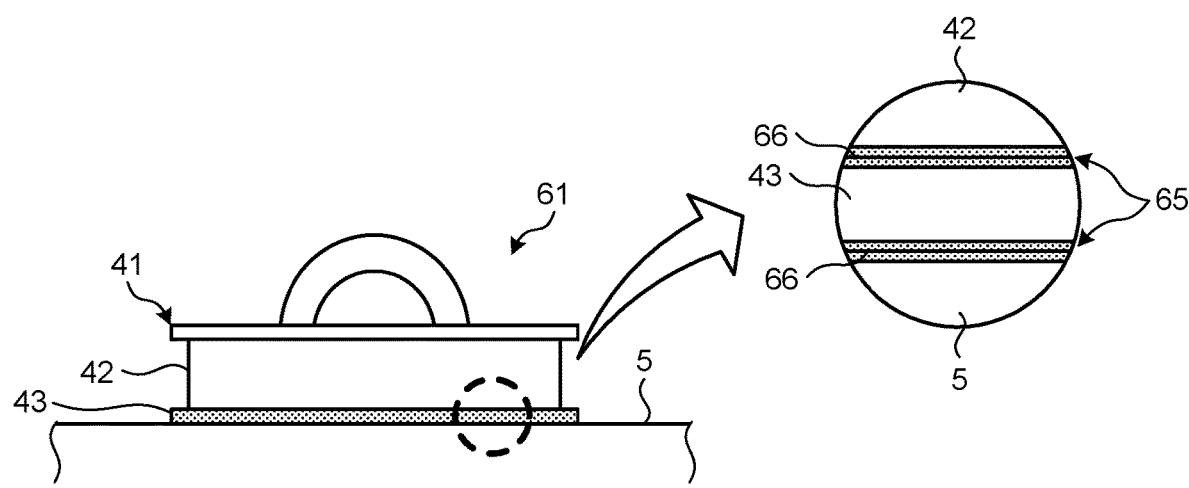
FIG. 11 is a side view of a loading pad according to a third embodiment.

A third embodiment will now be explained with reference to FIG. 11. In the third embodiment, to avoid redundancy in the explanation, the parts that are different from those in the first and the second embodiments will be explained, and the parts having the same structure as those in the first and the second embodiments will be explained by assigning the same reference numerals thereto. FIG. 11 is a side view of a loading pad according to the third embodiment.

In a loading pad 61 according to the third embodiment, the adhesive layer 65 formed by bonding with an adhesive agent includes an impregnated film 66. The adhesive layers 65 are provided between the back skin 41 and the elastic body 42, and between the elastic body 42 and the inserted member 43, respectively. The adhesive layer 65 includes an adhesive agent and an impregnated film 66 impregnated with the adhesive agent. The impregnated film 66 is fibers such as woven fabric, and glass-fiber cloth is used, for example. Even if the surface to be bonded with the adhesive layer 65 is a surface having irregularity, the irregularity is absorbed by the impregnated film 66 containing the adhesive agent.

In the manner described above, the loading pad 31, 51, 61 and the loading device 10 according to the embodiment are understood as follows, for example.

The loading pad 31, 51, 61 according to a first aspect is a loading pad 31, 51, 61 that is attached to the specimen 5 to apply a load to the specimen 5, and that includes the back skin 41 on which the load is applied, the elastic body 42 that is provided between the back skin 41 and the specimen 5, and the inserted member 43 that is provided between the elastic body 42 and the specimen 5, wherein the back skin 41, the elastic body 42, and the inserted member 43 are bonded as one unit, and the inserted member 43 is less rigid than the specimen 5, and is more rigid than the elastic body 42.

With such a structure, because the inserted member 43 is provided between the specimen 5 and the elastic body 42, the changes in rigidity between the specimen 5 and the elastic body 42 can be made gradual. Therefore, it is possible to alleviate local concentration of stress in the adhesive layers in the boundary between the specimen 5 and the inserted member 43 and in the boundary between the inserted member 43 and the elastic body 42, so that a deterioration in the load-bearing capacity can be suppressed.

As a second aspect, the Young's modulus of the inserted member 43 is lower than the Young's modulus of the specimen 5 but higher than the Young's modulus of the elastic body 42.

With such a structure, by making the Young's modulus of the inserted member 43 different from those of the specimen 5 and the elastic body 42, a different material can be used for the inserted member 43, being different from those of the specimen 5 and the elastic body 42. Therefore, the rigidity of the inserted member 53 can be easily adjusted.

As a third aspect, the Young's modulus of the inserted member 43 is set within a range of 1 GPa to 10 GPa.

With such a configuration, a resin material may be used as the inserted member 43, for example.

As a fourth aspect, the inserted member 43 is the first inserted member 43a, and further includes a second inserted member 43c provided between the back skin 41 and the elastic body 42.

With such a structure, local concentration of stress can be alleviated also between the back skin 41 and the elastic body 42, and a deterioration in the load-bearing capacity can be suppressed.

As a fifth aspect, the inserted member 53 includes the member body 57 having the cavities 55 passing therethrough in a thickness direction that is a direction in which the elastic body 42 and the specimen 5 face each other.

With such a structure, the rigidity of the inserted member 53 can be easily adjusted using the cavities 55.

As a sixth aspect, defining a cavity ratio as a ratio of the areas of the cavities 55 per a unit area in a view in the thickness direction, the inserted member 53 has a cavity ratio within a range of 70% to 90%.

With such a structure, the cavity ratio can be set appropriately, considering the durability of the inserted member 53.

As a seventh aspect, the inserted member 53 further includes the flat plate 58 that is bonded to one surface of the member body 57 in the thickness direction.

With such a structure, the rigidity of the inserted member 53 can be increased, on the side provided with the flat plate 58. Therefore, the rigidity can be also changed within the inserted member 53. In this manner, by making the inserted member 53 more rigid on the side facing the specimen 5 and less rigid on the side of the elastic body 42, for example, it is possible to keep the change in rigidity between the specimen 5 and the elastic body 42 more gradual.

As an eighth aspect, the adhesive layers 65 formed by bonding with an adhesive agent is provided between the back skin 41 and the elastic body 42 and between the elastic body 42 and the inserted member 43, and the adhesive layers 65 each include the adhesive agent and the impregnated film 66 impregnated with the adhesive agent.

With such a structure, even if the bonding surface is a surface with irregularity, the impregnated film 66 containing an adhesive agent can absorb the irregularity. Therefore, bonding strength can be improved.

The loading device 10 according to a ninth aspect includes the loading pad 31, 51, 61, the connector jig 32 connecting a plurality of the loading pads 31, 51, 61, and the actuator 11 applying a load to the specimen 5 via the loading pads 31, 51, 61 and the connector jig 32.

With such a structure, it is possible to apply a load appropriately to the specimen 5 while suppressing a deterioration in the load-bearing capacity.

REFERENCE SIGNS LIST

5 Specimen
10 Loading device
11 Actuator
21 Cylinder
22 Piston
31 Loading pad
32 Connector jig
41 Back skin
42 Elastic body
43 Inserted member
51 Loading pad
53 Inserted member
55 Cavities
57 Member body
58 Flat plate
61 Loading pad
65 Adhesive layer
66 Impregnated film

The invention claimed is:

1. A loading pad to be attached to a specimen to apply a load to the specimen, the loading pad comprising:
   a back skin on which the load is applied;
   an elastic body that is provided between the back skin and the specimen; and
   an inserted member that is provided between the elastic body and the specimen, wherein
   the back skin, the elastic body, and the inserted member are bonded as one unit, and
   the inserted member is less rigid than the specimen, and is more rigid than the elastic body.

2. The loading pad according to claim 1, wherein a Young's modulus of the inserted member is lower than a Young's modulus of the specimen, and is higher than a Young's modulus of the elastic body.

3. The loading pad according to claim 2, wherein the Young's modulus of the inserted member is set within a range of 1 GPa to 10 GPa.

4. The loading pad according to claim 1, wherein
   the inserted member is a first inserted member, and
   the loading pad further comprises a second inserted member provided between the back skin and the elastic body.

5. The loading pad according to claim 1, wherein the inserted member has a member body provided with a cavity passing through the member body in a thickness direction that is a direction in which the elastic body and the specimen face each other.

6. The loading pad according to claim 5, wherein, defining a cavity ratio as a ratio of an area of the cavity per a unit area in a view in the thickness direction, the inserted member has a cavity ratio within a range of 70% to 90%.

7. The loading pad according to claim 5, wherein the inserted member further includes a flat plate that is bonded to one surface of the member body in the thickness direction.

8. The loading pad according to claim 1, wherein
   adhesive layers formed by bonding using an adhesive agent are provided between the back skin and the elastic body, and between the elastic body and the inserted member, and
   the adhesive layers each include the adhesive agent, and an impregnated film impregnated with the adhesive agent.

9. A loading device comprising:
   the loading pad according to claim 1;
   a connector jig that connects a plurality of the loading pads; and
   an actuator that applies a load on the specimen via the loading pad and the connector jig.

* * * * *